United States Patent
Hosokawa et al.

(10) Patent No.: US 10,748,058 B2
(45) Date of Patent: Aug. 18, 2020

(54) LUT BASED NEURON MEMBRANE POTENTIAL UPDATE SCHEME IN STDP NEUROMORPHIC SYSTEMS

(71) Applicant: INTERNATIONAL BUSINESS MACHINES CORPORATION, Armonk, NY (US)

(72) Inventors: Kohji Hosokawa, Shiga-ken (JP); Masatoshi Ishii, Shiga-ken (JP); Yutaka Nakamura, Kyoto (JP); Junka Okazawa, Kyoto (JP); Takeo Yasuda, Nara-Ken (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1139 days.

(21) Appl. No.: 14/980,295

(22) Filed: Dec. 28, 2015

(65) Prior Publication Data

US 2017/0185891 A1 Jun. 29, 2017

(51) Int. Cl.
*G06N 3/063* (2006.01)
*G06N 3/04* (2006.01)

(52) U.S. Cl.
CPC .............. *G06N 3/063* (2013.01); *G06N 3/049* (2013.01)

(58) Field of Classification Search
CPC .................................. G06N 3/063; G06N 3/049
See application file for complete search history.

(56) References Cited

U.S. PATENT DOCUMENTS 5,278,945 A * 1/1994 Basehore ............... G06N 3/063
706/41
5,333,239 A 7/1994 Watanabe et al.
(Continued)

FOREIGN PATENT DOCUMENTS

WO 2014189970 11/2014

OTHER PUBLICATIONS

Frank, et al., "An Accelerator for Neural Networks with Pulse-Coded Model Neurons", IEEE Transactions on Neural Networks, vol. 10, No.3, May 1999 (Year: 1999).*

(Continued)

*Primary Examiner* — Robert A Cassity
*Assistant Examiner* — Tsu-Chang Lee
(74) *Attorney, Agent, or Firm* — Tutunjian & Bitetto, P.C.; Vazken Alexanian

(57) ABSTRACT

A method and system are provided for updating a neuron membrane potential in a spike time dependent plasticity model in a Neuromorphic system. The method includes approximating a shape of an analog spike signal from an axon input using a hardware-based digital axon timer. The method further includes generating a first intermediately updated neuron membrane potential value from a current axon timer value, a current synapse weight value and a current neuron membrane potential value using a first look-up table and an accumulator. The method also includes generating a second intermediately updated neuron membrane potential value with a leak decay effect using a second look-up table and the first intermediately updated neuron membrane potential value. The method additionally includes generating a final updated neuron membrane potential value based on a comparison of the second intermediately updated neuron membrane potential value with a neuron fire threshold level using a comparator.

25 Claims, 10 Drawing Sheets

(56) References Cited

U.S. PATENT DOCUMENTS

| | | | |
|---|---|---|---|
| 6,266,705 B1* | 7/2001 | Ullum | H04L 12/467 709/238 |
| 9,087,301 B2 | 7/2015 | Alvarez-Icaza Rivera et al. | |
| 9,111,224 B2 | 8/2015 | Hunzinger | |
| 9,984,326 B1 | 5/2018 | Chen et al. | |
| 10,055,434 B2 | 8/2018 | Birdwell et al. | |
| 2012/0084241 A1* | 4/2012 | Friedman | G06N 3/049 706/27 |
| 2014/0012788 A1 | 1/2014 | Piekniewski | |
| 2014/0032465 A1 | 1/2014 | Modha et al. | |
| 2014/0180984 A1 | 6/2014 | Arthur et al. | |
| 2014/0180985 A1* | 6/2014 | Alvarez-Icaza Rivera | G06N 3/049 706/16 |
| 2014/0310216 A1 | 10/2014 | Sarah et al. | |
| 2014/0351186 A1 | 11/2014 | Julian et al. | |
| 2015/0046381 A1 | 2/2015 | Malone et al. | |
| 2015/0046382 A1 | 2/2015 | Rangan | |
| 2015/0106315 A1 | 4/2015 | Birdwell et al. | |
| 2015/0106316 A1 | 4/2015 | Birdwell et al. | |
| 2015/0242743 A1 | 8/2015 | Esser et al. | |
| 2016/0034812 A1 | 2/2016 | Gibson | |

OTHER PUBLICATIONS

Merolla et al., "A Digital Neuro-synaptic Core Using Embedded Crossbar Memory with 45pJ per Spike in 45nm", 201 IEEE Custom Integrated Circuit Conference (CICC), Sep. 19-21, 2011 (Year: 2011).*

U.S. Office Action issued in U.S. Appl. No. 15/168,959, dated Jan. 24, 2019, pp. 1-16.

Pfeil, T. et al., "Is a 4-bit synaptic weight resolution enough?—constraints on enabling spike-timing dependent plasticity in neuromorphic hardware" Frontiers in Neuroscience (Jul. 2012) pp. 1-19, vol. 6, article 90.

Schmiedt, T. et al., "Spike timing-dependent plasticity as dynamic filter" Advances in Neural Information Processing Systems (Jan. 2010) pp. 1-9.

U.S. Office Action issued in U.S. Appl. No. 14/980,554, dated Jan. 2, 2018, pp. 1-30.

Jin, X. et al., "Implementing Spike-Timing-Dependent Plasticity on SpiNNaker Neuromorphic Hardware" IEEE (Oct. 2010) pp. 1-8.

Kim, Y. et al., "A Digital Neuromorphic Vlsi Architecture With Memristor Crossbar Synaptic Array for Machine Learning" IEEE International SOC Conference (Sep. 2012) pp. 328-333.

U.S. Office Action issued in U.S. Appl. No. 14/980,505, dated Feb. 11, 2019, pp. 1-53.

List of IBM Patents or Patent Applications Treated as Related.

Arthur, et al., "Building Block of a Programmable Neuromorphic Substrate: A Digital Neurosynaptic Core", IEEE International Joint Conference on Neural Networks, Jun. 2012, 8 pages.

Azghadi, et al., "Spike-Based Synaptic Plasticity in Silicon: Design, Implementation, Application, and Challenges", Proceedings of the IEEE, May 2014, pp. 717-737, vol. 102, No. 5.

Merolla, et al., "A Digital Neurosynaptic Core Using Embedded Crossbar Memory with 45pJ per Spike in 45nm", IBM Research, Sep. 2011 pp. 1-4.

Wu, et al., "Homogeneous Spiking Neuromorphic System for Real-World Pattern Recognition", IEEE Journal on Emerging and Selected Topics in Circuits and Systems, Jun. 2015, pp. 1-13, vol. 5, No. 2.

Wu, et al., "A CMOS Spiking Neuron for Brain-Inspired Neural Networks with Resistive Synapses and In-Situ Learning", IEEE Transactions on Circuits and Systems-II: Express Brief, May 2015, 6 pages.

Wang, "A Neuromorphic Implementation of Multiple Spike-timing Synaptic Plasticity Rules for Large-Scale Neural Networks", Frontiers in Neuroscience, May 2015, 17 pages.

U.S. Office Action issued in U.S. Appl. No. 15/168,959 dated Nov. 14, 2019.

Sangsu Park et al., "Electronic system with memristive synapses for pattern recognition", Scientific Reports, www.nature.com/scientifcreports, May 2015.

U.S. Office Action issued in U.S. Appl. No. 14/980,554 dated Aug. 20, 2019 (24 pages).

U.S. Office Action issued in U.S. Appl. No. 15/168,959 dated May 29, 2019, 13 pages.

U.S. Office Action issued in U.S. Appl. No. 14/980,554, dated May 29, 2020, pp. 1-14.

* cited by examiner

LUT BASED NEURON MEMBRANE POTENTIAL UPDATE SCHEME IN STDP NEUROMORPHIC SYSTEMS

BACKGROUND

Technical Field

The present invention relates generally to information processing and, in particular, to a look-up table (LUT) based Neuron membrane Potential (NP) update scheme in Spike Time Dependent Plasticity (STDP) neuromorphic systems.

Description of the Related Art

Software simulation for neuromorphic systems with a spike time dependent plasticity (STDP) model takes a significant amount of time even when used with a simple model, a small scale size, for only for a simple operation such as hand-writing number recognition and so forth. A hardware implementation can achieve a much faster operation (e.g., about $10^3$ times or more). This enables a large number of learning cycles within a practical operation time frame and real-time on-system (e.g., on-chip for a neuromorphic chip) learning.

Thus, there is a need for a hardware-based approach to updating Neuron membrane Potential (NP).

SUMMARY

According to an aspect of the present principles, a method is provided for updating a neuron membrane potential in a spike time dependent plasticity model in a Neuromorphic system. The method includes approximating a shape of an analog spike signal from an axon input using a hardware-based digital axon timer. The method further includes generating a first intermediately updated neuron membrane potential value from a current axon timer value, a current synapse weight value and a current neuron membrane potential value using a first look-up table and an accumulator. The method also includes generating a second intermediately updated neuron membrane potential value with a leak decay effect using a second look-up table and the first intermediately updated neuron membrane potential value. The method additionally includes generating a final updated neuron membrane potential value based on a comparison of the second intermediately updated neuron membrane potential value with a neuron fire threshold level using a comparator.

According to another aspect of the present principles, a computer program product is provided for updating a neuron membrane potential in a spike time dependent plasticity model in a Neuromorphic system. The computer program product comprising a non-transitory computer readable storage medium having program instructions embodied therewith. The program instructions are executable by a computer to cause the computer to perform a method. The method includes approximating a shape of an analog spike signal from an axon input using a hardware-based digital axon timer. The method further includes generating a first intermediately updated neuron membrane potential value from a current axon timer value, a current synapse weight value and a current neuron membrane potential value using a first look-up table and an accumulator. The method also includes generating a second intermediately updated neuron membrane potential value with a leak decay effect using a second look-up table and the first intermediately updated neuron membrane potential update. The method additionally includes generating a final updated neuron membrane potential value based on a comparison of the second intermediately updated neuron membrane potential value with neuron fire threshold level using a comparator.

According to yet another aspect of the present principles, a system is provided for updating a neuron potential in a spike time dependent plasticity model in a Neuromorphic system. The system includes a hardware-based digital axon timer for approximating an analog spike signal from an axon input. The system further includes a processor configured to generate a first intermediately updated neuron membrane potential value from a current axon timer value, a current synapse weight value and a current neuron membrane potential value using a first look-up table and accumulator. The processor is further configured to generate a second intermediately updated neuron membrane potential value with a leak decay effect using a second look-up table and the first intermediately updated neuron membrane potential value. The processor is also configured to generate final updated neuron membrane potential value based on a comparison of the second intermediately updated neuron membrane potential value with a neuron fire threshold level using a comparator.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to a look-up table (LUT) based Neuron membrane Potential (NP) update scheme in Spike Time Dependent Plasticity (STDP) neuromorphic systems.

Figure 1:
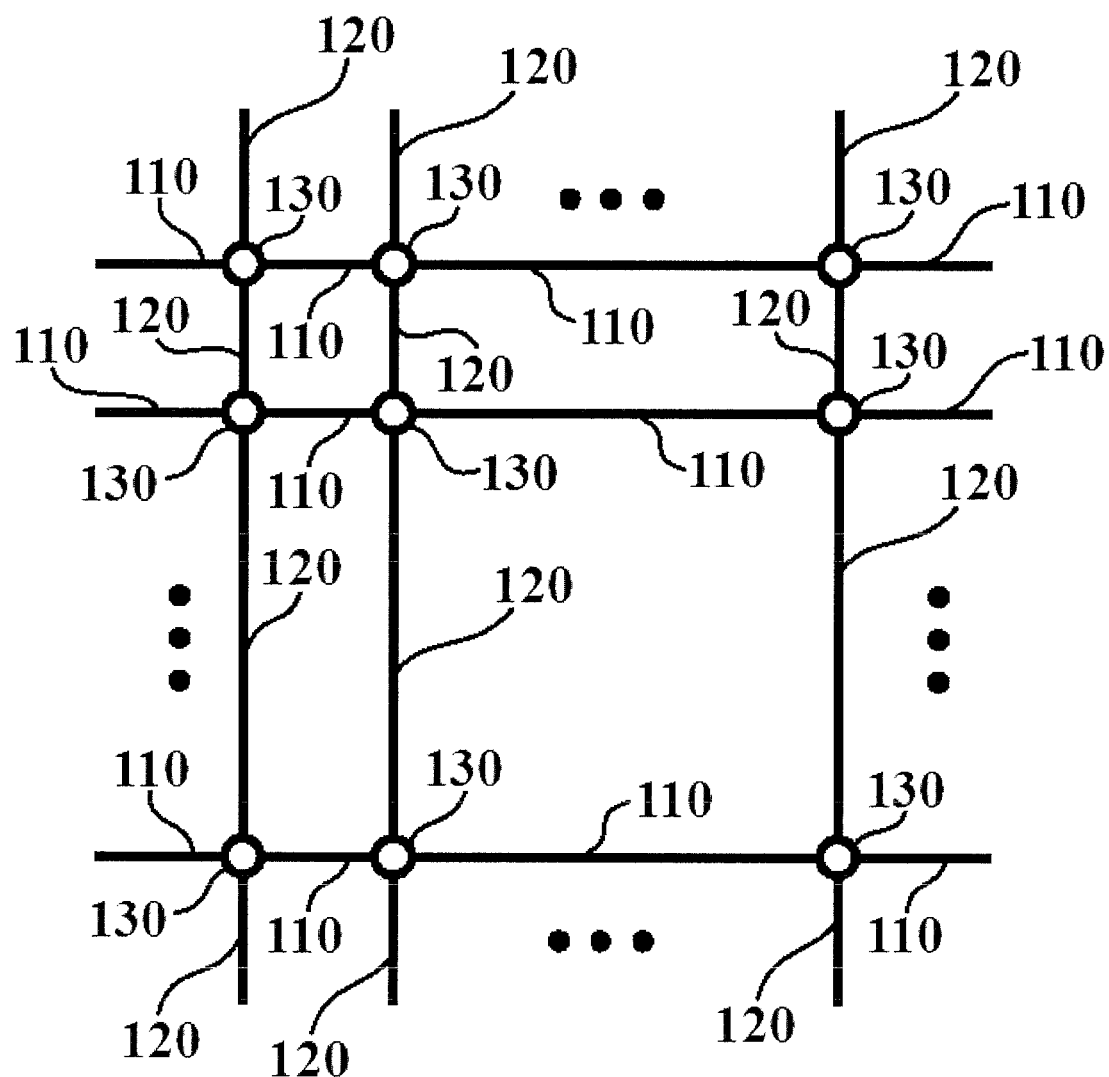
FIG. 1 shows synapses 130 having a crossbar structure, to which the present principles can be applied, in accordance with an embodiment of the present principles.

FIG. 1 shows synapses 130 having a crossbar structure, to which the present principles can be applied, in accordance with an embodiment of the present principles.

In a typical neuromorphic system, a synapse 130 is connected between an axon 110 of a neuron (a pre-neuron) and a dendrite 120 of another neuron (a post-neuron). Thus, axons 110 are shown horizontally and dendrites 120 are shown vertically in the crossbar structure. Each synapse 130 has its own Synapse Weight (SW) value, which shows the strength of the connection. In the STDP model, the SW values are updated with the timing between (1) an axon 110 spike from the pre-neuron, and (2) a dendrite 120 spike from the post-neuron. In the present scheme, synapses 130 are assumed to have a crossbar structure. However, other types of synapse structures may be used in connection with the present principles. In a crossbar structure, the axons 110 and dendrites 120 are perpendicular to each other and the two 110, 120 cross at the synapses 130.

In the text and Figures described hereinafter, the parameter i represents the number of a particular row, j represents the number of a particular column, and k represents the number of a particular evaluation cycle. Thus the numbering for the row related signals such as, e.g., axon input, axon timer and synapse weight memory row, is represented with i. On the other hand, the numbering for the column related signals such as, e.g., dendrite output, dendrite timer, dendrite output register, neuron potential and synapse weight memory column is represented with j. The numbering for the evaluation related cycle is represented with k.

Figure 2:
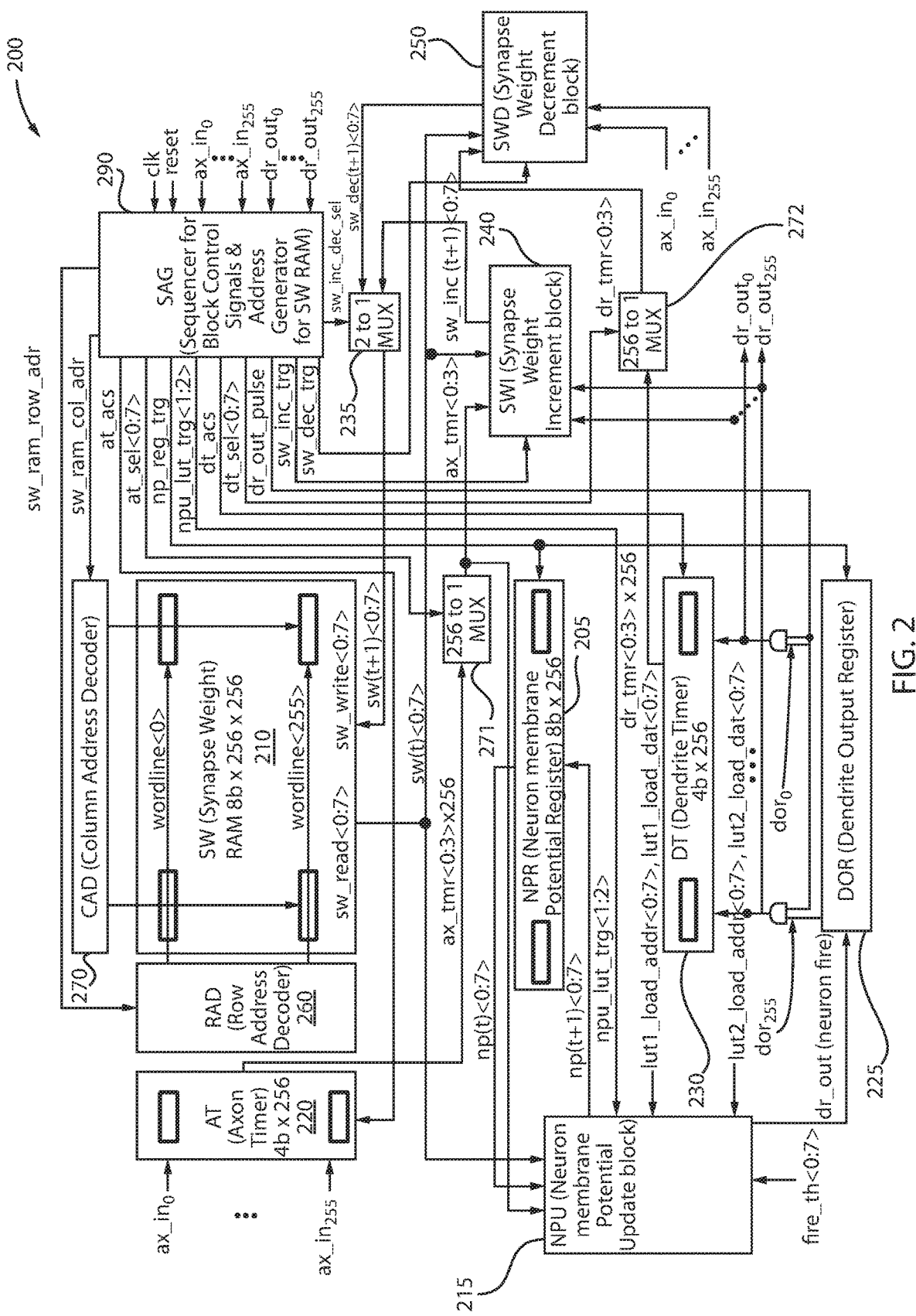
FIG. 2 shows an exemplary neuromorphic system 200, in accordance with an embodiment of the present principles.

FIG. 2 shows an exemplary neuromorphic system 200, in accordance with an embodiment of the present principles. While some of the elements of system 200 are referred to as blocks, the same can be implemented using hardware as integrated circuits.

In system 200, synapse devices with a crossbar structure are implemented with Synapse Weight (SW) Random Access Memory (RAM) 210. In one example, there is a configuration with 256 neurons and $256^2$ (65536) synapses. The number of neurons, however, can be any number and can be modified according to the target application. The synapse weight (SW) data for these synapses is stored in the SW RAM 210 in, for example, 8 bit each. The raw and column of the SW RAM 210 correspond to the axon and neuron body (or dendrite), respectively. That is, in one example, the SW RAM (i, j) 210 (or $SW_{ij}$) (for i, j=0 to 255) shows the SW value of the synapse between axon i and dendrite j (or neuron body j).

Spike timing at the axon and at the dendrite (or neuron body) has to be monitored. This is due to the fact that the timing difference between the axon spike and the dendrite spike is one of the most important parameters in the STDP model. Thus, this scheme expects timing information for the axon spike and the dendrite spike to be obtained and monitored. One way to supply this information is to use an Axon Timer (AT) 220 and a Dendrite Timer (DT) 230. These timers 220, 230 provide elapsed times since a spike is given to the axon nodes and the dendrite nodes of the synapses, respectively. The lengths of the AT 220 and the DT 230 are, for example, in 4 bits. However, these lengths can be determined according to the target application. The AT 220 and DT 230 work like a decrement counter and are preset at the spike-in timing.

The STDP model uses the spike timing information for the SW update operation. The SWI block 240 increments the SW values and the SWD block 250 decrements the SW values, respectively. LUTs are used in SWI 240 and SWD 250 blocks. In an embodiment of the present principles, the contents of these LUTs are prepared based on the simulation or hardware measurement results. In another embodiment, the contents are pre-loaded into each LUT with the load_address and load_data signals. There is a large amount of data in the LUTs, and, if all of the data for the LUT is acquired, the data can be loaded in these LUTs. However, if there is any missing data in the measurement or simulation for the LUTs, the missing data can be calculated with interpolation or extrapolation using existing data. In addition to the measurement and the simulation, the contents of the LUTs can be supplied with equations or a mixture of them.

The increment and decrement amounts of the SW values can be determined with current AT 220, DT 230, and SW values. A Row Address Decoder (RAD) 260 and a Column Address Recorder (CAD) 270 decode row and column addresses for the SW RAM 210. The RAD 260 and CAD 270 are used for read and write access to the SW RAM 210, respectively. The read access, sw_read<0:7>, is used to obtain the current SW value, sw(t)<0:7>, and the write access, sw_write<0:7>, is used to replace the current SW value, sw(t)<0:7>, with the next SW value, sw(t+1)<0:7>. In an embodiment of the present principles, there is a configuration that has 256 individual $AT_i$ (i=0 to 255) in the AT 220 block and 256 individual $DT_j$ (j=0 to 255) in the DT 220 block. However, the number of individual ATs in the AT 220 and the number of individual DTs in the DT 230 can be modified according to the target application. In this configuration, the trigger spike signals of individual $AT_i$ (i=0 to 255) and the individual $DT_j$ (j=0 to 255) are assigned to i-th axon input (ax_in$_i$) and j-th dendrite output (dr_out$_j$), one by one, respectively. Thus the total 256 AT data ax_tmr$_i$(t)<0:3> for ax_in$_i$ (i=0 to 255) and the total 256 DT data dr_tmr$_j$(t)<0:3> for dr_out$_j$ (j=0 to 255) can be prepared at the outputs of the AT 220 and the DT 230 at the same time, respectively. However the Neuron membrane Potential Update block (NPU) 215, SWD 240 and SWI 250 can process only one AT data (ax_tmr(t)<0:3>) or only one DT data (dr_tmr(t)<0:3>) at one time because they have sequential processing architecture. Therefore there are two 256 to 1 MUXs 271 and 272 for the AT data selection and DT data selection, respectively. The selection timing control signals at_sel<0:7> and dt_sel<0:7> for MUXs 271 and 272 are generated by a sequencer for block control signals and address generator for SW RAM (SAG) 290. A 2 to 1 MUX 235 selects one of the results from either the SWD block 250 (sw_dec(t+1)<0:7>) or the SWI block 240 (sw_inc(t+1)<0:7>) which is to be written to the SW RAM 210 as updated SW data (sw(t+1) <0:7>). The selection signal sw_inc_dec_sel for the MUX 235 is generated by the SAG 290, too. The SAG 290 generates row address signal (sw_ram_row_adr) and column address signal (sw_ram_col_adr) for both read and write access to SW RAM. They are converted into word select signals and column select signals in the RAD 260 and the CAD 270, respectively. As the SAG 290 controls the timing sequence of the whole system, it generates access or trigger signals for the blocks AT 220, DT 230, SWI 240 and SWD 250, too. Those are described as at_acs, dt_acs, sw_inc_trg and sw_dec_trg, respectively. The SAG generates a pulse signal (dr_out_pulse) to get reshaped dendrite output spike signals dr_out$_j$ (j=0 to 255) from de-serialized (parallel converted) neuron fire status signals dor$_j$ (j=0 to 255). The SAG 290 implements the timing sequence generating trigger or the control (select) signals to the other blocks. The SAG 290 receives clock signal clk, reset signal reset, axon input spike ax_in$_i$ (i=0 to 255), and dendrite output spike dr_out$_j$ (j=0 to 255) as its input signals and generates almost all of the timing and sequence control signals in this implemented model or circuit.

Additionally, the SAG 290 sends a trigger signal np_reg_trg to a Neuron membrane Potential Register (NPR) 205, which stores 256 data for the Neuron membrane Potential (NP) in, for example, 8 bit each. The SAG 290 further sends a trigger signals npu_lut_trg<1:2> to the NPU 215. In the NPU 215, an NP value is updated with AT values which correspond to elapsed time since spike input at axon input arises (ax_tmr<0:3>), the current SW values for corresponding synapses (sw(t)<0:7>), and the current NP value (np(t)<0:7>). The updated NP value, np(t+1)<0:7>, is then sent to the NPR 205. As the NPU 215 processes the NP update one by one, the NP data (np(t)<0:7> and np(t+1)<0:7>) are transferred between NPR 205 and NPU 215 in sequential manner.

The NPU 215 further checks whether the NP reaches a certain threshold level value (fire_th<0:7>) to generate a fire signal (dr_out (neuron fire)). The NPU 215 implements this operation with the leaky decay of the NP. These operations are called Leaky Integrate and Fire (LIF) operations. In order to implement the LIF function, the NPU receives input signals for the current AT 220, SW and NP values. The NPU generates first intermediately updated NP values. The NPU then adds the leaky decay effect and generates the second intermediately updated NP signal for the final updated (next) NP value.

Figure 10:
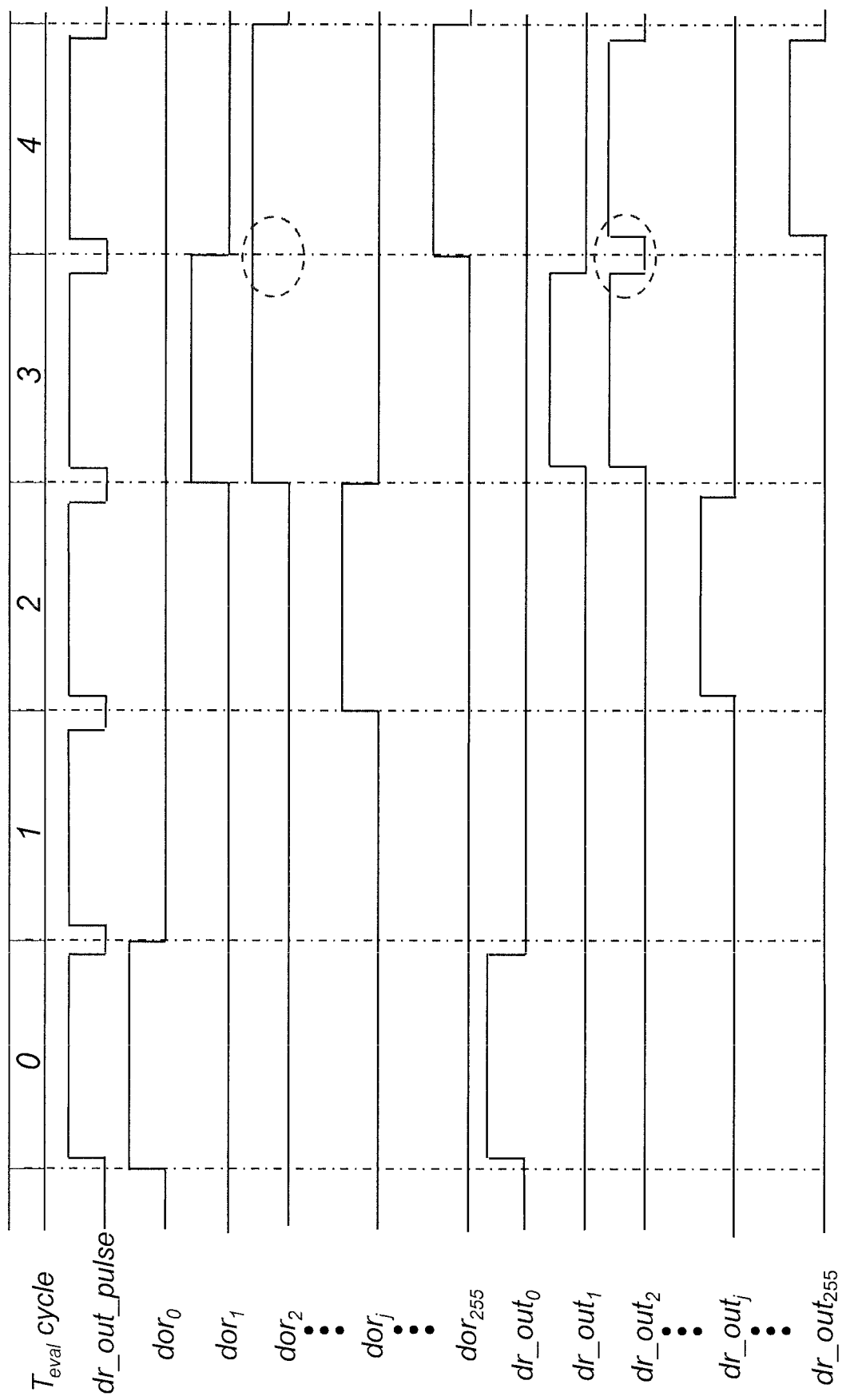
FIG. 10 is a timing diagram showing output signals of the Dendrite Output Register (DOR) and reshaped dendrite output spike signals, in accordance with an embodiment of the present principles.

Furthermore, in a Dendrite Output Register (DOR) 225, a serial to parallel conversion of dr_out (neuron fire) signal is achieved. This may be needed because internal signals are processed in a serial manner, while the external interface is processed in a parallel manner. The DOR 225 converts a serial signal, dr_out (neuron fire), to parallel signals (dor$_j$, j=0 to 255) to give parallel system output signals (dor_out$_j$, j=0 to 255) which are also input signals to the synapse or the axon of the next synapse. The dor_out$_j$ (j=0 to 255) are gated pulse signals of dor$_j$ (j=0 to 255) signals by dor_out_pulse. The dor$_j$ (j=0 to 255) signals stay high or low throughout the cycle. On the other hand, dor_out$_j$ (j=0 to 255) should be short spike pulse signal when dor$_j$ (j=0 to 255) is at only high state. The effect of this difference is to avoid pulse merging with adjacent cycle which is shown in FIG. 10. FIG. 10 is a timing diagram showing output signals of the Dendrite Output Register (DOR) dor$_j$ (j=0 to 255) and reshaped dendrite output spike signals dr_out$_j$ (j=0 to 255), in accordance with an embodiment of the present principles.

Figure 3:
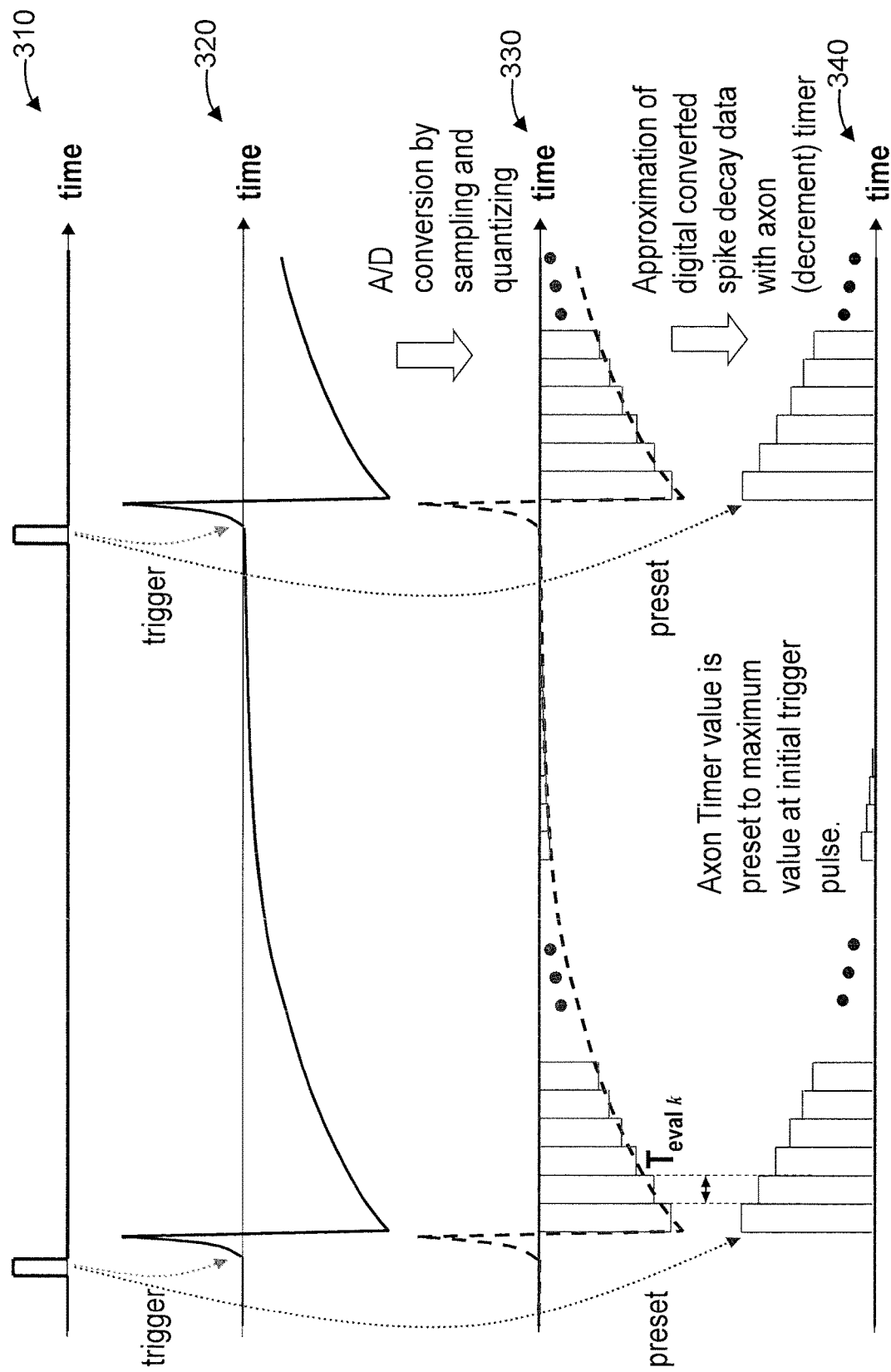
FIG. 3 shows waveforms for several signals used to implement the present principles, in accordance with an embodiment of the present principles.

FIG. 3 shows waveforms for several signals used to implement the present principles, in accordance with an embodiment of the present principles. A spike trigger signal 310 is supplied as square wave pulse. A virtual analog spike 320 is input to the system from an axon. The virtual analog spike 320 is triggered using the spike trigger signal 310. The virtual analog spike 320 is based on an STDP model and it affects a neuron cell body through a connected synapse in order to update a NP values. As the shape of this waveform is fixed, it can be converted with a fixed set of digital data 330. Further, the effect of the spike input is implemented with AT (decrement timer for axon) with approximation. The AT's behavior is denoted by the reference numeral 340. The individual ATs are prepared for all axons and they operate independently.

When a spike trigger signal is supplied to a certain axon, the corresponding AT is preset to a certain maximum value. However, when no spike trigger signal is supplied to the axon, the corresponding AT data decreases by certain amount until it equals to zero.

Figure 4:
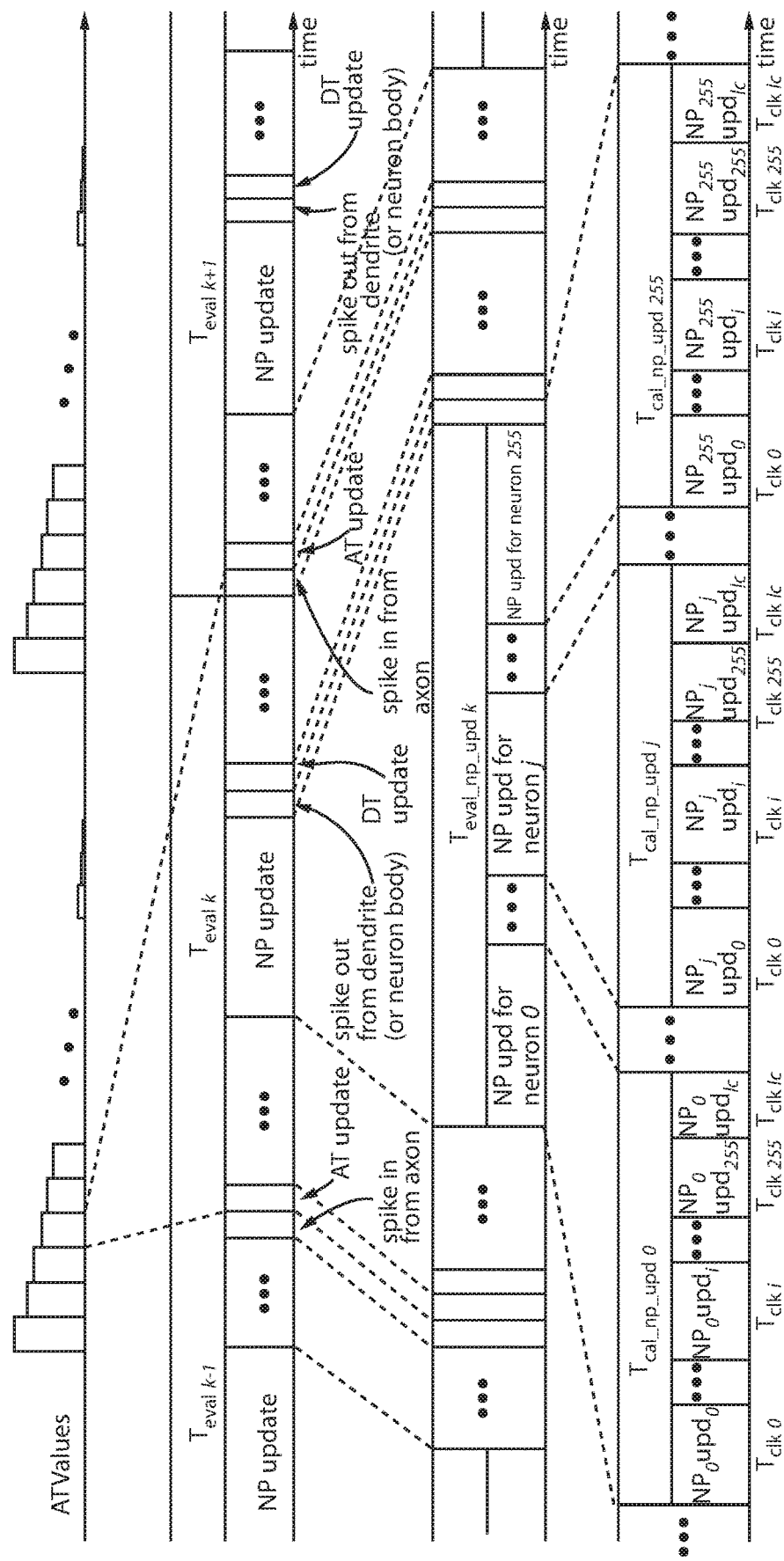
FIG. 4 shows hierarchy 400 of a cycle time used to implement the present principles, in accordance with an embodiment of the present principles.

FIG. 4 shows hierarchy 400 of a cycle time used to implement the present principles, in accordance with an embodiment of the present principles.

The following definitions apply regarding at least FIG. 4.

$T_{eval\ k}$: k-th evaluation cycle which includes update cycles for the NP, SW, AT, DT values as well as spike input and output and neuron status check cycles.

$T_{eval\_np\_upd\ k}$: k-th NP update cycle for all neurons, included in $T_{eval\ k}$ cycle $T_{cal\_np\_upd\ j}$: NP$_j$ update cycle.

$T_{clk\ i}$: NP$_j$ upd$_i$ ⇒ NP$_j$ update partial cycle with SW$_{ij}$ times AT$_i$ value for i=0 to 255 (LUT1 access and accumulation for 256 times).

$T_{clk\ lc}$: NP$_j$ upd$_{lc}$ ⇒ NP$_j$ update partial cycle with leak effect apply & neuron fire check (LUT2 access & threshold comparison for only once).

The AT is updated every $T_{eval\ k}$ cycle. In the $T_{eval\ k}$ cycle, there is $T_{eval\_np\_upd\ k}$ cycle which is prepared only for NP update according to the fixed AT value in $T_{eval\ k}$ cycle. In the $T_{eval\_np\_upd\ k}$ cycle, NP update for all neurons are completed. There are a total of 256 (total number of neurons) $T_{cal\_np\_upd\ j}$ (j=0 to 255) cycles in one $T_{eval\_np\_upd\ k}$ cycle.

The DT is also updated every $T_{eval\ k}$ cycle however it is used not for NP update but for SW update based on STDP rule. So detailed explanation for DT update is skipped here.

The NP for each neuron is calculated at every $T_{cal\_np\_upd\ j}$ (j=0 to 255) cycle. In the $T_{cal\_np\_upd\ j}$ (j=0 to 255) cycle, NP for a neuron j (j=0 to 255) is calculated with all (256) AT values and 256 SW values in the corresponding column j (or neuron j). The AT data and SW data for corresponding neurons are multiplied to access an LUT which stores delta value of NP. $T_{clk\ i}$ (i=0 to 255) or NP$_j$ upd$_i$ (i=0 to 255) cycle is the access cycle also for the AT and SW RAM to get AT and SW data. $T_{clk\ lc}$ or NP$_j$ upd$_{lc}$ cycle includes the access cycle for another LUT for leak effect and neuron fire check cycle in the NPU 215. There are a total of 256 (the number of axons) $T_{clk\ i}$ (i=0 to 255) cycles and one $T_{clk\ lc}$ cycle in each $T_{cal\_np\_upd\ j}$ (j=0 to 255) cycle.

Figure 5:
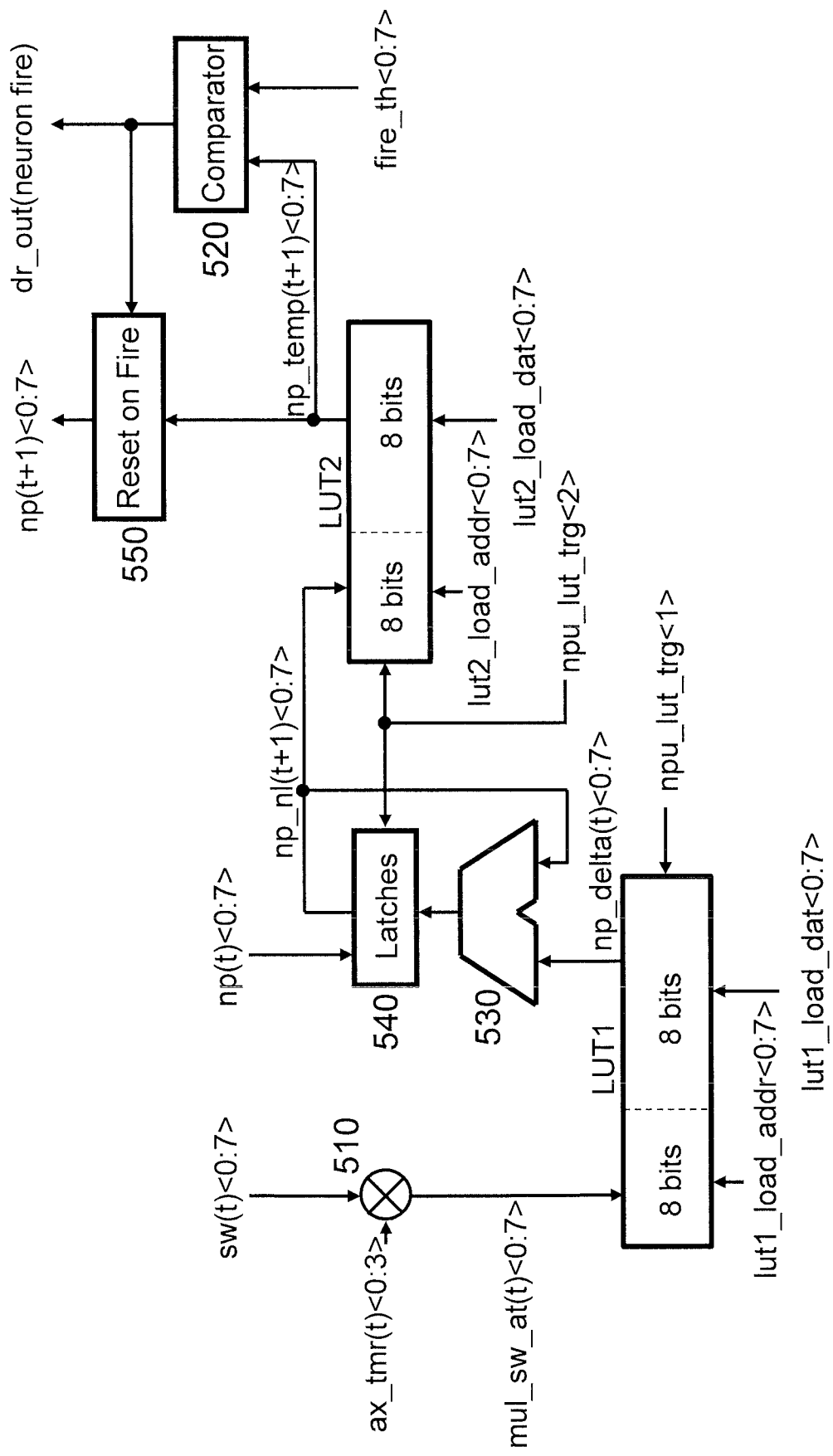
FIG. 5 shows block diagram of a Neuron Potential Update (NPU), in accordance with an embodiment of the present principles.

FIG. 5 shows block diagram of a Neuron Potential Update (NPU), in accordance with an embodiment of the present principles. In an embodiment, the NPU can be block 215 of FIG. 2.

There are 2 LUTs, namely LUT1 and LU2 whose accesses are triggered by npu_lut_trg<1> and npu_lut_trg<2>, respectively. LUT1 is for an NP update by AT and SW values while LUT2 is for affecting leak decay. The current SW and AT values (sw(t)<0:7> and ax_tmr(t)<0:3>) are multiplied (by a multiplier 510) to get SW times AT value (mul_sw_at (t)<0:7>) which is used as address for LUT1 access. LUT1 gives a delta value of NP (np_delta(t)<0:7>) which is accumulated (by an accumulator 530) to give an updated NP value with no leak decay effect (np_nl(t+1)<0:7>). The npu_lut_trg<1> timing signal is used for this LUT1 access. After 256 times LUT1 access for accumulation, the NP value is defined as first intermediately updated NP value. Only at the initial step of Tcal_np_upd$_j$ (j=0 to 255) cycle, the current NP (np(t)<0:7>) is loaded to latches 540 for initialization of the accumulation. The npu_lut_trg<2> signal is used for this purpose, too. The Tcal_np_upd$_1$ (j=0 to 255) cycle continues until the NP update for one j-th (j=0 to 255) neuron is completed. This cycle repeats 256 times for the update of all neurons j's (j=0 to 255) NP.

After that, the first intermediately updated NP values are used as an address for LUT2 access. This access is triggered by npu_lut_trg<2> signal. The output from LUT2 is the updated NP value with leak decay effect. At the same time, the next Tcal_np_upd$_{j+1}$ (j=0 to 254) cycle starts to calculate NP with no leak effect for the next neuron. Finally this output value np_temp(t+1)<0:7> is compared (by a comparator 520) with a threshold level for fire (fire_th<0:7>) to decide whether the neuron fires or not. The access for LUT1 occurs at every Tclk$_i$ (i=0 to 255) cycle while the access for LUT2 occurs once at the beginning of next Tcal_np_upd$_1$ (j=0 to 255) cycle (with npu_lut_trg<2> signal). Thus the LUT2 access occurs at every Tcal_np_upd$_j$ (j=0 to 255) cycle (once for every 256 times Tclk$_i$ (i=0 to 255) cycles). When the neuron fires, dr_out (neuron fire) signal is activated and the final NP value (np(t+1)<0:7>) is reset (by reset on fire block 550) to zero or any initialization value. Otherwise the dr_out (neuron fire) signal is not activated and the final NP value (np(t+1)<0:7>) is updated with the value np_temp(t+1)<0:7>. The contents of LUT1 and LUT2 should be prepared based on simulation or hardware measurement results. If there is any missing data for the LUTs, it can be calculated by interpolation or extrapolation with respect to the existing data. The content values of LUT1 (or LUT2) are loaded (written) with lut1_load_addr<0:7> (or lut2_load_addr<0:7>) and lut1_load_dat<0:7> (or lut2_load_dat<0:7>) values.

Figure 6:
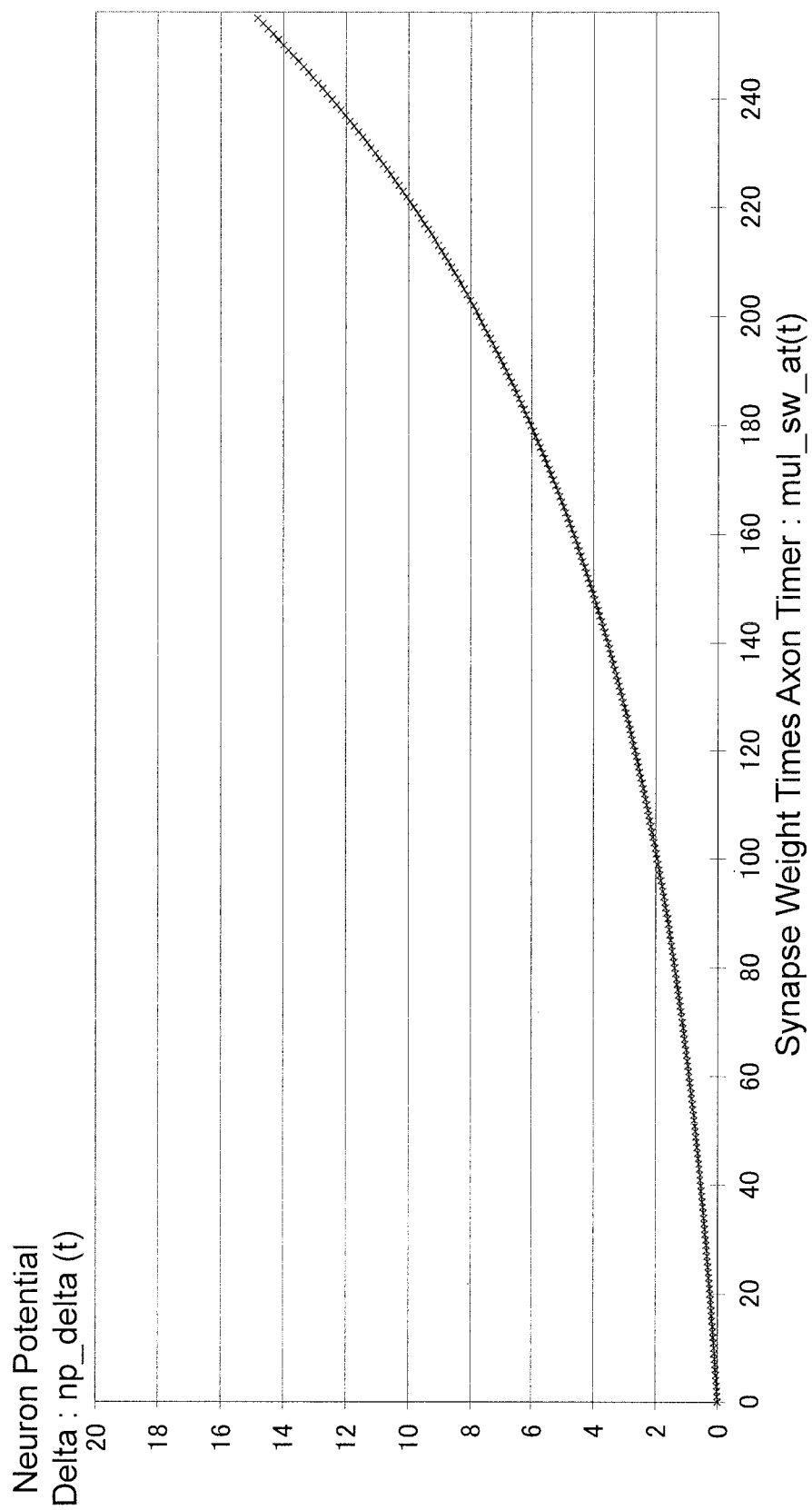
FIG. 6 show exemplary contents 600 of LUT1, in accordance with an embodiment of the present principles.
Figure 7:
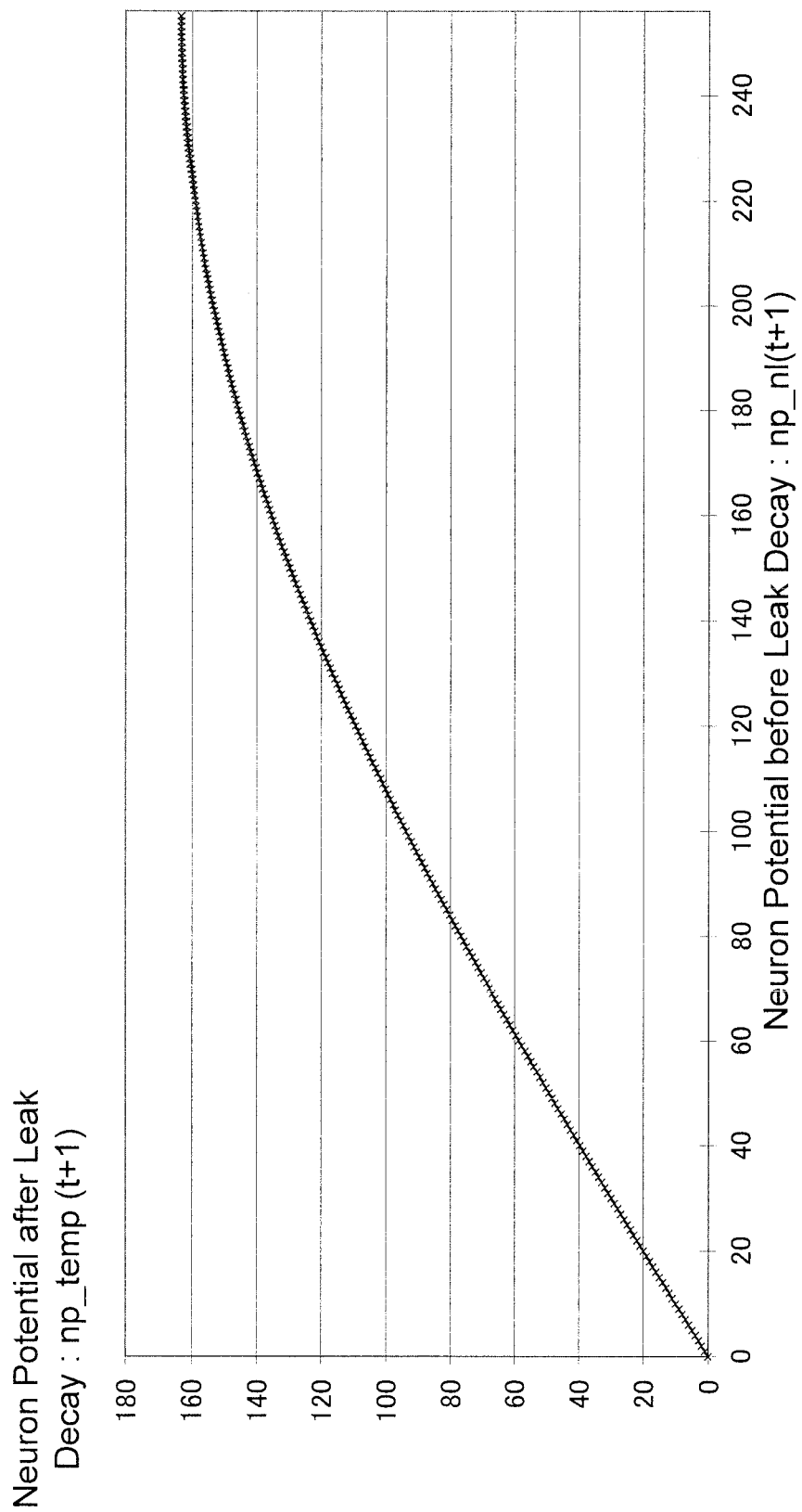
FIG. 7 shows exemplary contents 700 of LUT2, in accordance with an embodiment of the present principles.

FIG. 6 show exemplary contents 600 of LUT1, in accordance with an embodiment of the present principles. FIG. 7 shows exemplary contents 700 of LUT2, in accordance with an embodiment of the present principles. In the examples of FIGS. 6 and 7, all the data for the LUT is calculated with equations based on simulation results. The data for LUT1 is determined using Equation (1), while the data for LUT2 is determined using Equation (2).

Equation (1) is as follows:

$$np\_delta(t) = 2^{\{mul\_sw\_at(t)/p\}} - 1, \text{ where curve } @p=64$$

Equation (2) is as follows:

$$np\_temp(t+1) = \frac{2q}{\pi}\sin\left\{\frac{\pi}{2q}np\_nl(t+1)\right\}, \text{ where curve} @q=256$$

In this system, NP and SW are expressed, for example, with 8-bit digital (256 steps) data while AT is expressed with 4 bit data. The NP Update Block receives input data np(t)<0:7>, ax_tmr(t)<0:3> and sw(t)<0:7> and generates output data np(t+1)<0:7> and dr_out (neuron fire). The np(t)<0:7> and np(t+1)<0:7> are NP values at current and next evaluation time steps, respectively. The number of neuron cell bodies (or dendrites), axons, synapses and data bits can be modified according to the target application.

Figure 8:
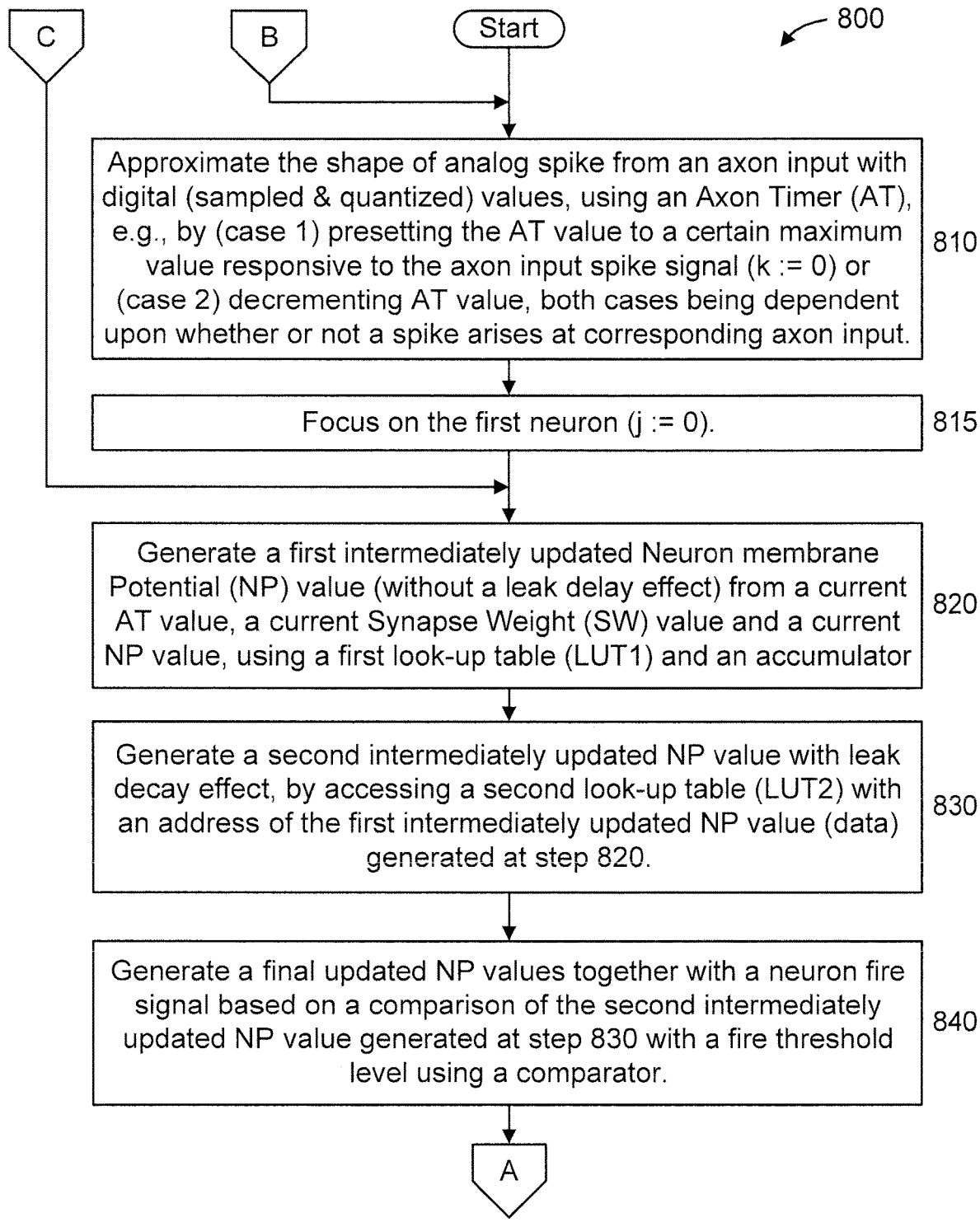
FIGS. 8-9 show a look-up table (LUT) based Neuron membrane Potential (NP) update method 800 in a Spike Time Dependent Plasticity (STDP) neuromorphic system, in accordance with an embodiment of the present principles.
Figure 9:
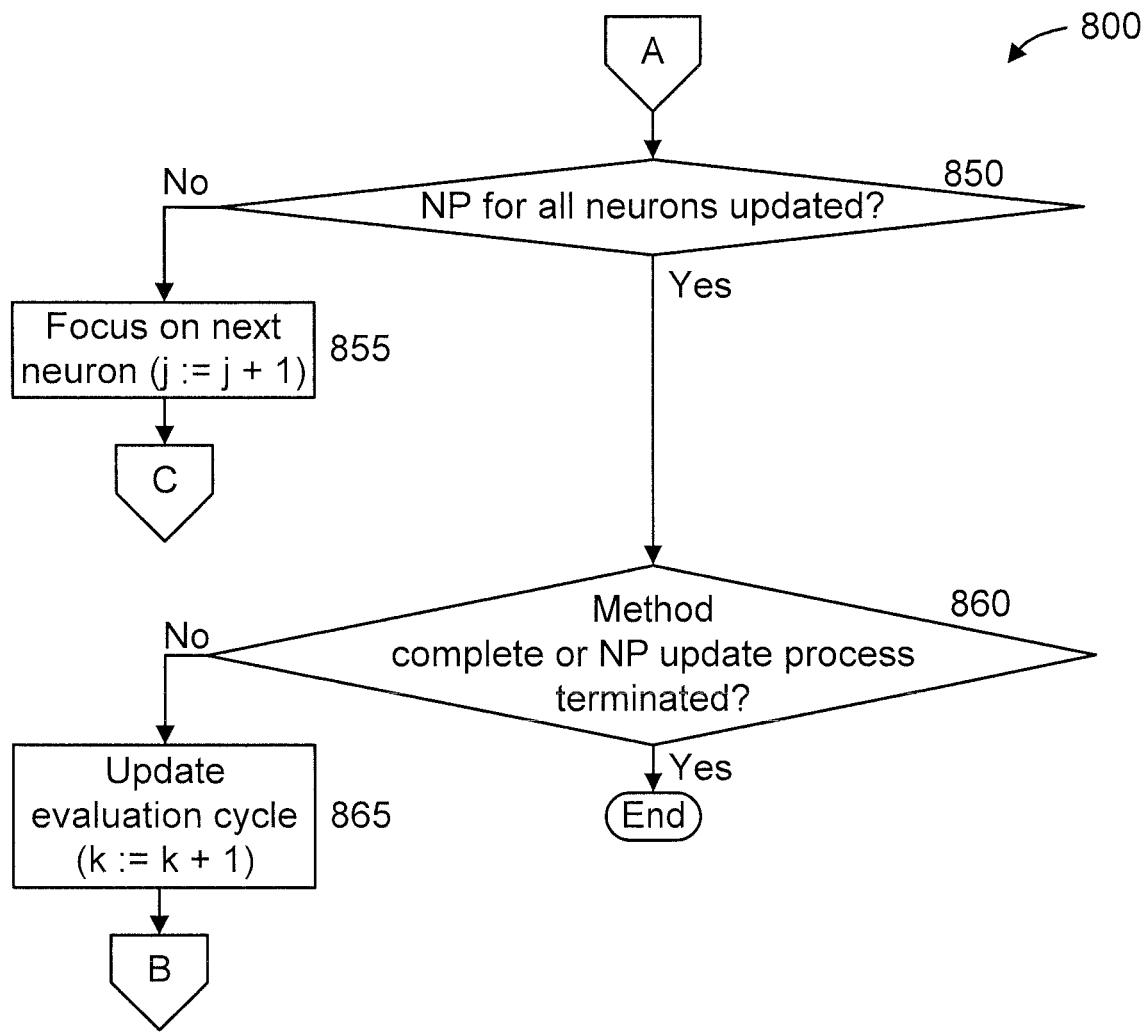

FIG. 8 shows a look-up table (LUT) based Neuron membrane Potential (NP) update method 800 in a Spike Time Dependent Plasticity (STDP) neuromorphic system, in accordance with an embodiment of the present principles.

At step 810, approximate the shape of analog spike from an axon input with digital (sampled & quantized) values, using an Axon Timer (AT). The digitizing of the analog spike from the neuron minimizes the error for Neuron membrane Potential (NP) estimation. In an embodiment, step 810 involves (case 1) presetting the AT value to a certain maximum value responsive to the axon input spike signal (k:=0) or (case 2) decrementing AT value, with both cases dependent upon whether or not a spike arises at a corresponding axon input.

At step 815, focus on first neuron at column 0 (set j=0).

At step 820, generate a first intermediately updated Neuron membrane Potential (NP) value (without a leak delay effect) from a current AT value, a current Synapse Weight (SW) value and a current NP value, using a first look-up table (LUT1) and an accumulator. This enables complicated NP characteristic by just loading simulation or hardware measurement data into the look-up table (LUT1).

In an embodiment, the AT value is determined from the timing of an axon spike, using the AT 220. In an embodiment, the SW value is determined from the timing between an axon spike from a pre-neuron (e.g., using the AT timer 220), and a dendrite spike from a post-neuron (e.g., using the DT 230). In an embodiment, the current NP value is determined based on the current AT value, the current SW value and LUT1, where LUT1 data provides 256 (the number of AT or the row number of SW RAM) delta NP values. In an embodiment, an access address for accessing LUT1 is determined from the product of the current AT value and the current SW value.

At step 830, generate a second intermediately updated NP value with leak decay effect (that is, add leak decay effect to the first intermediately updated NP value generated at step 820), by accessing a second look-up table (LUT2) only once with an address of the first intermediately updated NP value (data) generated at step 820. This enables complicated leak decay effect by just loading simulation or hardware measurement data into the look-up table (LUT2). In an embodiment, an address for accessing LUT2 is determined as a first intermediately updated NP value np_nl(t+1) <0:7>, whereby the leak decay effect is added in the second intermediately updated NP value which is the data accessed by that address.

At step 840, generate a final updated NP values together with a neuron fire signal based on a comparison of the second intermediately updated NP value generated at step 830 with a fire threshold level using a comparator.

At step 850, determine whether all neurons have been updated (i.e., 255 iterations (repeats) for a total of 256 runs of method 800 from step 820 to step 840 in order to update all neurons). If so, then the method proceeds to step 860. Otherwise, the method proceeds to step 855.

At step 855, focus on the next neuron (j:=j+1). The method then returns to step 820.

At step 860, determine whether or not any of (1) the method has completed or (2) the NP update process has been terminated. If so, then the method 800 is terminated. Otherwise, the method proceeds to step 865.

At step 865, update the evaluation cycle (k:=k+1). Then the method returns to step 810, where the same operation repeats with an updated (preset or decremented) AT value.

The operations from step 810 to step 840 are performed in one evaluation time cycle. Hierarchical time cycles (steps) are introduced within one evaluation time cycle (step). In this scheme, NP update operations are processed in sequential process from step 820 to step 840 although the corresponding operations in biological neuron are processed concurrently in parallel.

A description will now be given of some of the advantages and effects of the present principles.

For example, using the approach described herein:
(1) simulation or hardware measurement based on an analog spiking neuron can be implemented with high accuracy;
(2) a leak decay function can be easily implemented; and
(3) performance can be free from Phase, Voltage, and Temperature (PVT) variation and, thus, achieve a good model hardware correlation unlike analog implementations. This enables us to implement accurate system quickly with reconfigurable logic such as FPGAs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for updating a neuron membrane potential in a spike time dependent plasticity model in a Neuromorphic system, the method comprising:
    approximating a shape of an analog spike signal from an axon input with digital values using a hardware-based digital axon timer;
    generating a first intermediately updated neuron membrane potential value without a leak delay affect from a current axon timer value from among the digital values, a current synapse weight value and a current neuron membrane potential value using multiple accesses of a first look-up table and an accumulator for accumulating from the multiple accesses, the current neuron memory potential value determined from the current axon timer value, the current synapse weight value and the first look up table;
    generating a second intermediately updated neuron membrane potential value with the leak decay effect directly from a single access of a second look-up table using the first intermediately updated neuron membrane potential update as an access address of the single access; and
    generating a final updated neuron membrane potential value based on a comparison of the second intermediately updated neuron membrane potential value with a neuron fire threshold level using a comparator,
    wherein the accumulator is directly coupled to both the first look-up table and the second look-up table.

2. The method of claim 1, further comprising computing an address for accessing the first look-up table as a product of the current synapse weight value and the current axon timer value.

3. The method of claim 2, wherein the product is used to access a corresponding neuron membrane potential delta value in the first look-up table.

4. The method of claim 1, wherein the first look-up table stores delta values for first intermediately updated neuron membrane potential values that are accumulated to generate the first intermediately updated neuron membrane potential value.

5. The method of claim 1, wherein the first intermediately updated neuron membrane potential value is used as an address to access the second look-up table for the leak decay effect.

6. The method of claim 1, wherein a selection of a first case or a second case is based on a result of the comparison, the first case corresponding to a neuron firing, the second case corresponding to a lack of the neuron firing, and wherein for the final updated neuron membrane potential value, a next or final updated neuron membrane potential value is reset to zero or a pre-determined preset value and a neuron fire spike is generated and output in the first case, or the second intermediately updated value is used as the final updated neuron membrane potential value without generating and outputting the neuron fire spike in the second case.

7. The method of claim 1, wherein the current synapse weight value is stored in a random access memory having a plurality of rows and a plurality of columns, the random access memory being configured to store a plurality of synapse weight values for a plurality of synapses occurring between a plurality of axons and a plurality of dendrites, wherein one of the plurality of memory rows corresponds to one of the plurality of axons and one of the plurality of memory columns corresponds to one of the plurality of dendrites.

8. The method of claim 1, wherein said approximating step comprises presetting the axon timer to a certain maximum value responsive to an input signal to a corresponding axon.

9. The method of claim 8, further comprising decrementing an axon timer value, starting at a certain maximum value over several evaluation cycles, to obtain an elapsed time since a last axon digital input spike for the corresponding axon.

10. The method of claim 1, wherein at least one of the first look-up table and the second look-up table are loaded with values obtained from measurements of actual neurons or equations of approximation models.

11. The method of claim 1, wherein respective access frequencies of the first look-up table and the second look-up table are different for a same evaluation cycle.

12. A computer program product for updating a neuron membrane potential in a spike time dependent plasticity model in a Neuromorphic system, the computer program product comprising a non-transitory computer readable storage medium having program instructions embodied therewith, the program instructions executable by a computer to cause the computer to perform a method comprising:
    approximating a shape of an analog spike signal from an axon input with digital values using a hardware-based digital axon timer;
    generating a first intermediately updated neuron membrane potential value without a leak delay effect from a current axon timer value from among the digital values, a current synapse weight value and a current neuron membrane potential value using multiple accesses of a first look-up table and an accumulator for accumulating from the multiple accesses, the current neuron memory potential value determined from the current axon timer value, the current synapse weight value and the first look up table;
    generating a second intermediately updated neuron membrane potential value with the leak decay effect directly from a single access of a second look-up table using the first intermediately updated neuron membrane potential update as an access address of the single access; and generating a final updated neuron membrane potential value based on a comparison of the second intermediately updated neuron membrane potential value with neuron fire threshold level using a comparator, wherein the accumulator is directly coupled to both the first look-up table and the second look-up table.

13. The computer program product of claim 12, further comprising computing an address for accessing the first look-up table as a product of the current synapse weight value and the current axon timer value.

14. The computer program product of claim 13, wherein the product is used to access a corresponding neuron membrane potential delta value in the first look-up table.

15. The computer program product of claim 12, wherein the first look-up table stores delta values for first intermediately updated neuron membrane potential values that are accumulated to generate the first intermediately updated neuron potential value.

16. The computer program product of claim 12, wherein the first intermediately updated neuron membrane potential value is used as an address to access the second look-up table for the leak decay effect.

17. The computer program product of claim 12, wherein the current synapse weight value is stored in a random access memory having a plurality of rows and a plurality of columns, the random access memory being configured to store a plurality of synapse weight values for a plurality of synapses occurring between a plurality of axons and a plurality of dendrites, wherein one of the plurality of memory rows corresponds to one of the plurality of axons and one of the plurality of memory columns corresponds to one of the plurality of dendrites.

18. The computer program product of claim 12, wherein said approximating step comprises presetting the axon timer to a certain maximum value responsive to an input signal to a corresponding axon.

19. The computer program product of claim 18, further comprising decrementing an axon timer value, starting at a certain maximum value over several evaluation cycles, to obtain an elapsed time since a last axon digital input spike for the corresponding axon.

20. The computer program product of claim 12, wherein at least one of the first look-up table and the second look-up table are loaded with values obtained from measurements of actual neurons, simulation results or equations of approximation models.

21. The computer program product of claim 12, wherein respective access frequencies of the first look-up table and the second look-up table are different for a same evaluation cycle.

22. The computer program product of claim 12, wherein a selection of a first case or a second case is based on a result of the comparison, the first case corresponding to a neuron firing, the second case corresponding to a lack of the neuron firing, and wherein for the final updated neuron membrane potential value, a next or final updated neuron membrane potential value is reset to zero or a pre-determined preset value and a neuron fire spike is generated and output in the first case, or the second intermediately updated value is used as the final updated neuron membrane potential value without generating and outputting the neuron fire spike in the second case.

23. A system for updating a neuron potential in a spike time dependent plasticity model in a Neuromorphic system, the system comprising:

a hardware-based digital axon timer for approximating an analog spike signal from an axon input with digital values;

a processor configured to:
generate a first intermediately updated neuron membrane potential value without a leak delay effect from a current axon timer value from among the digital values, a current synapse weight value and a current neuron membrane potential value using multiple accesses of a first look-up table and an accumulator for accumulating from the multiple accesses, the current neuron memory potential value determined from the current axon timer value, the current synapse weight value and the first look up table;

generate a second intermediately updated neuron membrane potential value with the leak decay effect directly from a single access of a second look-up table using the first intermediately updated neuron membrane potential update as an access address of the single access; and generate final updated neuron membrane potential value based on a comparison of the second intermediately updated neuron membrane potential value with a neuron fire threshold level using a comparator, wherein the accumulator is directly coupled to both the first look-up table and the second look-up table.

24. The system of claim 23, wherein the processor is further configured to compute an address for accessing the first look-up table as a product of the current synapse weight value and the current axon timer value.

25. The system of claim 23, wherein the first intermediately updated neuron membrane potential value is used as an address to access the second look-up table for the leak decay effect.

* * * * *